United States Patent [19]
Frietzsche et al.

[11] 3,827,529
[45] Aug. 6, 1974

[54] SOUND DAMPENER FOR A FLAT ENGINE MOUNTED IN THE STERN OF A MOTOR VEHICLE

[75] Inventors: Gunther Frietzsche; Peter Krause, both of Edenkoben/Pfalz, Germany

[73] Assignee: Fiem Heinrich Gillet KG, Weinstrasse, Germany

[22] Filed: Jan. 26, 1973

[21] Appl. No.: 326,880

[30] Foreign Application Priority Data
Jan. 27, 1972 Germany.................... 7202898[U]
June 13, 1972 Germany...................... 2228700

[52] U.S. Cl.............. 181/33 D, 181/35 C, 181/57, 181/40
[51] Int. Cl. .......................................... G10k 11/04
[58] Field of Search........... 181/36 E, 35 C, 40, 51, 181/56, 57, 35 D, 60, 53

[56] References Cited
UNITED STATES PATENTS
2,878,888  3/1959  Abarth................... 181/36 D UX
2,940,249  6/1960  Gospodar................... 181/40 X
3,189,122  6/1965  Martin................... 181/56
3,709,320  1/1973  Hollerl et al...................... 181/40

FOREIGN PATENTS OR APPLICATIONS
1,039,896  8/1966  Great Britain................ 181/53
1,169,724  5/1964  Germany................... 181/56

Primary Examiner—Richard B. Wilkinson
Assistant Examiner—Vit W. Miska
Attorney, Agent, or Firm—Robert H. Jacob

[57] ABSTRACT

The invention concerns a sound dampener or muffler for a flat engine mounted in the stern of a motor vehicle which is made of two circumferentially joined shells that form a housing divided into two chambers by a separating wall, with input and output pipes passing through the shell halves and where the wall supports the tuning elements and is provided with perforations for connecting the tuning elements.

5 Claims, 9 Drawing Figures

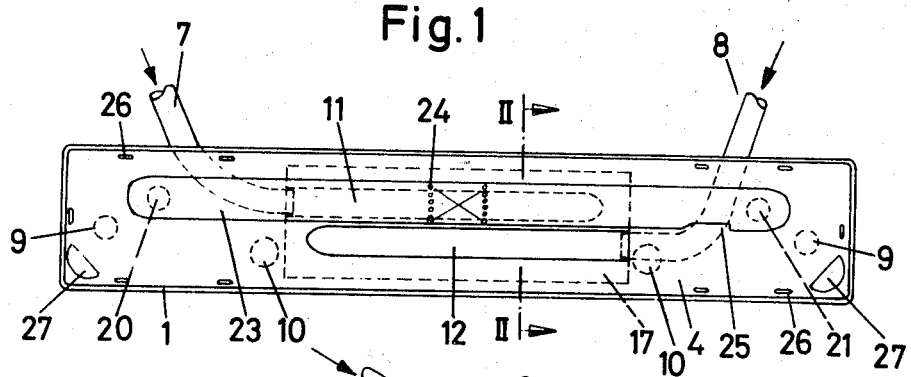
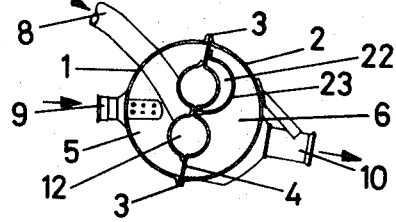
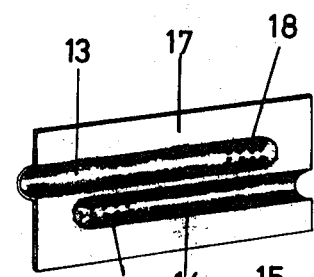
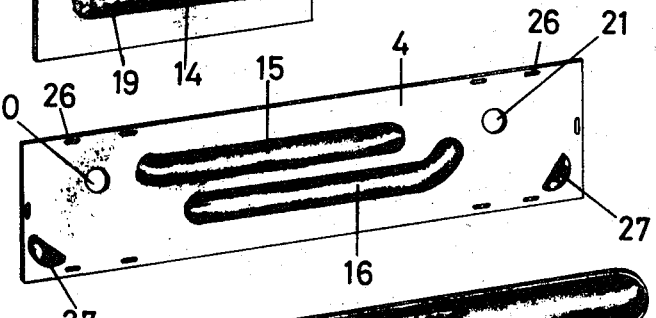
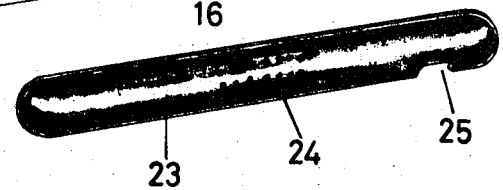

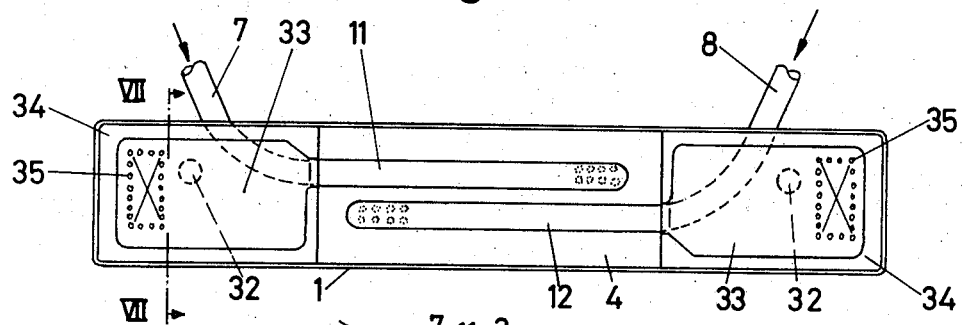
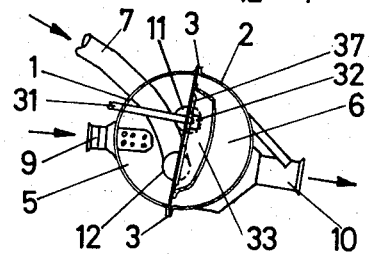
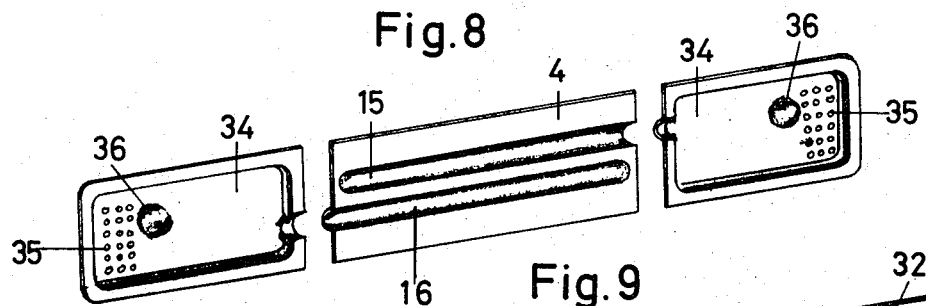
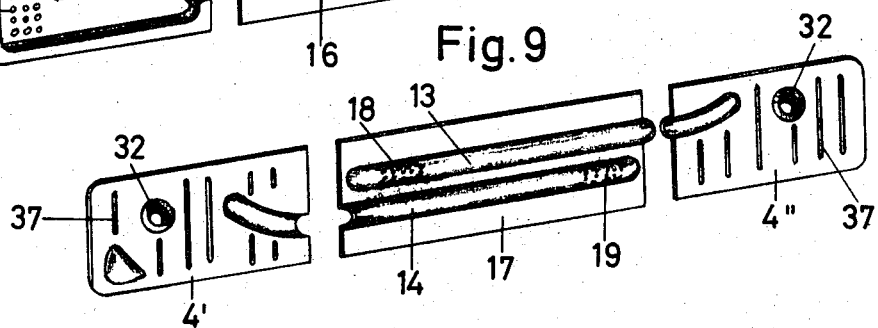

SOUND DAMPENER FOR A FLAT ENGINE MOUNTED IN THE STERN OF A MOTOR VEHICLE

The present invention relates to noise suppression means for automobiles. More in particular the invention concerns a sound dampener or muffler for a flat engine or boxer motor mounted in the stern of the vehicle to be driven. With motors of this type and their mounting in the back of the vehicle the conventional long connecting pipes from the motor to the sound dampener or muffler are missing which are used as effective components of the sound suppressing system. Thus the tuning requirements for such a sound dampener are initially more difficult than with vehicles having the engine in front, long connecting pipes and the sound dampener in the center or in the rear. Where the requirements for comfort are strict sound suppression equipments having two or more sound suppressors are used in vehicles having the engine in front, which is not possible to the same extent with motors in the stern.

Furthermore, the muffler for the motor construction and installation in question here must as a rule be disposed transversely of the direction of travel, essentially for reasons of the structural length of the vehicle. Accordingly the entrances and exits of the exhaust pipes on the muffler housing must likewise, as a rule, be provided in the side walls thereof and can only be provided in the end walls at increased expense.

For determination of the optimum output of the motor it is also necessary to introduce the exhaust pipes of the separate cylinders individually in the housing of the mufflers, so that, depending on the number of cylinders, two to six intake pipes and one to four exhaust pipes must enter or leave the muffler housing. Furthermore it is difficult to equip the muffler with the required number of resonator chambers in order to constitute its acoustic effectiveness in a manner that the dampening of the exhaust noise attains satisfactory values in all ranges of numbers of rotation. The cause of these problems is that for the existing installation conditions the acoustical separation of the input and exhaust pipes is particularly difficult. For that reason the known muffler mufflers are in many cases single chamber mufflers. In the event that a plurality of chambers exist, the muffler is built in a manner that considerable partial short circuits are present between the chambers which result in renewed limitation of the acoustic effect. Due to the difficulties mentioned, first in regard to the installation of the muffler, then in regard to its internal construction, these muffler are as a rule suitably designed for construction in shell form.

The conventional form of construction for such a muffler thus consists of two shell halves separated by a peripheral seam at which they are fitted together, where the input and the exhaust pipes pass partly through one shell half and partly through the other. The pipes are at least partly passed through the interior of the muffler housing where they are seated and supported in two transverse walls.

Based on the embodiment of a muffler described above, it is an object of the invention, while maintaining the volume and an economical construction thereof, to improve the acoustical effectiveness considerably. Thus an embodiment is to be obtained which optimally meets the acoustical as well as also the technical production requirements.

In accordance with the invention the problem is solved by a muffler having a housing made of two shells which are joined together circumferentially and by input and output pipes passing through the two shell halves, where the inner space of the muffler constituted by the two shell halves of the housing is divided by a separating wall into two chambers which are supported along the shell separating line between the two shells. This separating wall further accommodates the essential tuning elements of the muffler and is provided with perforations for connecting them with each other, respectively with the noise suppression chambers.

As an advantageous further development the tubular tuning elements may be formed by impressions of semi-circular cross-section in the separating wall and an associated plate of semi-circular cross-section, also provided with semi-circular impressions.

In this manner a muffler is formed with two chambers that define two dampening systems separated from one another acoustically in a sufficiently satisfactory manner, which results in an improvement of the dampening of the exhaust noises by several decibels. Thus as to total noise of the vehicle, the exhaust noise component no longer predominates, but the mechanical motor noise component is not reduced. This involves the prerequisite of improving the entire noise dampening by decreasing the mechanical noise radiation of the motor.

In a preferred embodiment the tuning elements provided, form two pipes which continue or extend the input pipes and which are provided at their ends with perforations that merge with one of the noise suppression chambers. On the opposite side of the separating wall one of the pipes is covered by a longitudinally extending shell which in its central area is in communication with the other noise dampening chamber by way of the perforations and leads into the first mentioned noise dampening chamber at its end areas by way of perforations in the separating wall.

By the construction and arrangement of the separating wall it can be connected in simplest fashion in the separating seam of the two shells in the usual manner, for example by a welding and/or crimping seam. This provides a simple production possibility. Furthermore, the separating wall with the tuning elements arranged on it or partially constituted thereby provides a muffler of great rigidity. The separating wall and the additional tuning elements may likewise be produced rationally especially for large line assembly, by suitable production methods, and connected with one another, for example by multiple point or rolled seam welding.

To stiffen the separating wall in order to accommodate the additional gas conducting parts and tuning elements and for adjusting the noise dampening insert for assembly, the separating wall may have different impression and assembly accommodations.

If, due to technical requirements of manufacture, for example predetermined production methods, a subdividing of the separating wall is useful, then this can be provided in a suitable manner without detracting from the acoustic qualities. It is then necessary to provide for sufficient sealing and stiffening of the separating walls.

If for better mixture preparation branched off pipe conduits are provided in the carburetor that are conducted below the carburetor, the invention provides furthermore to end them in the area of the perforations in the separating wall in the muffler, where these perforations are formed by crimping their edges in the manner of an ejector nozzle.

In order to obtain sufficient supply performance in these preheating pipes which define a shunt arm, the utilization of this ejector effect is necessary, which heretofore was obtained in that the ends of the pipes were directly led to the exhaust pipe of the muffler. There the nozzle effect in the output pipe existed but the total noise level increased by about 2 decibels (A) due to the lack of dampening of this shunt flow. Since prior to that the noise level already reaches the highest admissible limit, it was necessary to provide additional noise dampeners in order to again reach the output value. In the embodiment proposed the necessary ejector effect as well as the desired dampening are obtained.

In the area behind the perforations formed as ejector nozzles the longitudinally extending shell may be provided with pressed pockets in order to improve the ejector effect, or at least not impede it.

In a preferred embodiment, however, each perforation in the separating wall formed as an ejector leads into its own dampening chamber, which is in communication with the second noise suppression chamber by way of perforations provided in the outermost end area.

Particularly with this embodiment the subdividing of the separating wall already mentioned is advantageous. Here the subdividing is in a central area which receives the continuations of the input pipes and two end areas which constitute the specific chambers.

This provides particular production advantages because the chambers can be produced in advance and safely welded.

This additional construction of the muffler in accordance with the invention, where preheating pipes are used for the carburetor, provides at least the same preheating effect as the known devices, because it obtains the same supply performance as the known embodiments which have the introduction of the preheating pipes directly in the exit stubs. On the other hand, however, an acoustical improvement can be obtained of 3 to 4 decibels.

The invention is described and explained more in particular with reference to the accompanying drawings, in which FIG. 1 is a top view onto the separating wall of an open muffler;

FIG. 2 is a section along line II—II in FIG. 1;

FIGS. 3, 4 and 5 illustrate the individual parts of which the separating wall of this embodiment is assembled together with its associated tuning elements;

FIG. 6 shows a modified embodiment, again in open condition, and plan view upon the separating wall;

FIG. 7 is a section taken along line VII—VII in FIG. 6, and

FIGS. 8 and 9 show the individual parts from which the separating wall is assembled with its associated tuning elements.

The noise suppression housing comprises two half shells 1 and 2 which are connected with one another by a common circumferential seam 3. This seam may, as illustrated, be defined by a welded connection. It is, of course, also possible to provide a crimped connection.

The muffler housing thus formed is subdivided by a separating wall 4 into two chambers 5 and 6. This separating wall 4 is essentially flat and simultaneously secured by means of the seam 3 formed by welding with the connection of the two shell halves 1 and 2.

The exhaust gases of the motor are fed separately for each cylinder in a four-cylinder boxer motor, on the one hand by the two input pipes 7 and 8 and on the other hand by the two input stubs 9. The discharge of the waste gases is through the exhaust stub 10.

The pipes 7 and 8 lead into tuning elements defined by pipes 11 and 12, each of which is arranged by associated impressions 13 and 14 as well as 15 and 16, one in the separating wall 4 and the other in a plate 17 coordinated and connected with this separating wall. The connection between separating wall 4 and plate 17 may be by multi-point or rolled seam welding.

The impressions 13 and 14 in the plate 17 are provided with perforations 18 and 19 in the areas defining the pipe ends. By way of these perforations they are in communication with the input chamber 5 of the muffler.

The separating wall 4 is furthermore provided with perforations 20 and 21. These two perforations lead into a space 22 which is defined by a long shell 23 of semi-circular cross-section, which is likewise firmly connected with the separating wall 4. In the central area of this shell 23 a further perforation 24 is provided by way of which the space 22 is connected with the output chamber 6 of the muffler. On one of its longitudinal sides in the end area, shell 23 has a notch 25 which encompasses the pipe 8, a partial cross-section of which passes through the space 22.

For additional stiffening and simple aligning of the position of separating wall 4 in the muffler housing, the separating wall 4 is provided with impressions 26 and 27.

If in the embodiment in accordance with FIGS. 6 and 7 also preheating pipes 31 are included, the perforations in the separating wall 4 are formed by crimping their edges to form ejector nozzles 32. In order to prevent tensions due to heat the separating wall 4 may be provided proximate the ejector nozzles 32 with formed beads 37. Also, the separating wall may have imparted to it greater material strength than that of the pockets seated thereon.

It is still more advantageous, however, to have the two ejector nozzles 32 lead into their own chambers 33 which are defined by the separating wall 4 and the parts 34 welded thereon. In this connection it is advantageous to form the separating wall into three areas along its length, namely a center area for forming the pipes 11 and 12 and two end areas 4' and 4" (see FIG. 9) for forming the chambers 33. This provides advantages in the construction. Parts 34 are provided at their outermost end areas with perforations 35 by way of which they are in communication with the muffler chamber 6. Besides they may also have pocket-like recesses 36.

The preheating pipes 31 lead exactly in the area of the ejectors 32. Thus, sufficient ejector effect is provided for and thereby the conveying performance in the shunts defined by the preheating pipes. The gas flows of these shunts, however, no longer enter the exhaust stub without dampening as before, but they are also subject to sufficient dampening, as is the main gas stream.

Having now described our invention, what we desire to protect by letters patent of the United States is set forth in the appended claims.

We claim:

1. Muffler for suppressing the noise of the exhaust gases of a flat internal combustion engine for mounting in the stern of the vehicle to be driven having a housing defined by two shell halves of sheet metal joined circumferentially, input and output pipes passing through said shell halves and sound suppressing means comprising a separating wall extending centrally of said housing and dividing said housing into two chambers, said shell halves having edges along which they are held together, for example by welding, said separating wall defining and supporting tuned exhaust portions for said exhaust gases and having perforations defining connections between said chambers, a tube extending into said muffler for supplying exhaust gases and a tube extending out of said housing for discharging gases, and further tubular means for discharging a partial gas stream for heating a carburetor or the like, said further tubular means having ejector nozzles that are formed by crimping the edges of the perforations in said separating wall.

2. Muffler in accordance with claim 1, where said separating wall is subdivided into partial areas.

3. Muffler in accordance with claim 2, where said separating wall comprises lateral areas defining further suppression chambers.

4. Muffler in accordance with claim 1, where said separating wall is provided with reinforcing beads in the area surrounding the ejector nozzles in the separating wall in the area of the perforation of the edge.

5. Muffler in accordance with claim 3, where the thickness of the sheet metal of the separating wall is of greater strength than the parts defining additional chambers connected therewith.

* * * * *

UNITED STATES PATENT OFFICE
CERTIFICATE OF CORRECTION

Patent No. 3,827,529　　　　　Dated August 6, 1974

Inventor(s) Günther Frietzsche and Peter Krause

It is certified that error appears in the above-identified patent and that said Letters Patent are hereby corrected as shown below:

The correct name and address of the assignee is:

Firm Heinrich Gillet KG
    Edenkoben/Weinstrasse, Germany

Signed and sealed this 3rd day of December 1974.

(SEAL)
Attest:

McCOY M. GIBSON JR.　　　　　C. MARSHALL DANN
Attesting Officer　　　　　　Commissioner of Patents